(12) United States Patent
Ahmed et al.

(10) Patent No.: US 11,019,621 B2
(45) Date of Patent: May 25, 2021

(54) SPECTRUM EFFICIENCY FOR UPLINK WIRELESS COMMUNICATIONS

(71) Applicant: Nokia Technologies Oy, Espoo (FI)

(72) Inventors: Wessam Afifi Ahmed, Tucson, AZ (US); Enrico-Henrik Rantala, Berkeley, CA (US); Eric Torkildson, San Francisco, CA (US); Sayantan Choudhury, Berkeley, CA (US); Esa Juhani Tuomaala, El Cerrito, CA (US)

(73) Assignee: Nokia Technologies Oy, Espoo (FI)

( * ) Notice: Subject to any disclaimer, the term of this patent is extended or adjusted under 35 U.S.C. 154(b) by 860 days.

(21) Appl. No.: 15/067,380

(22) Filed: Mar. 11, 2016

(65) Prior Publication Data

US 2017/0265191 A1    Sep. 14, 2017

(51) Int. Cl.
*H04W 72/04* (2009.01)
*H04W 72/10* (2009.01)
*H04W 74/08* (2009.01)

(52) U.S. Cl.
CPC ... *H04W 72/0453* (2013.01); *H04W 74/0808* (2013.01); *H04W 72/10* (2013.01)

(58) Field of Classification Search
None
See application file for complete search history.

(56) References Cited

U.S. PATENT DOCUMENTS

| | | | | |
|---|---|---|---|---|
| 2008/0102852 A1* | 5/2008 | Du | ......................... | H04W 48/20 455/453 |
| 2008/0159128 A1* | 7/2008 | Shaffer | ................... | H04L 47/12 370/229 |
| 2009/0022136 A1* | 1/2009 | Joshi | ..................... | H04B 7/2123 370/348 |
| 2012/0014332 A1* | 1/2012 | Smith | ................... | H04M 15/60 370/329 |
| 2013/0051358 A1* | 2/2013 | Turtinen | ........... | H04W 72/0453 370/330 |

(Continued)

OTHER PUBLICATIONS

Nov. 2015—IEEE P802.11 Wireless LANs—Specification Framework for TGax.

(Continued)

*Primary Examiner* — Mariela Vidal Carpio
(74) *Attorney, Agent, or Firm* — Harrington & Smith

(57) ABSTRACT

A wireless network having one or more access points and one or more stations may improve spectrum efficiency for uplink transmissions by assigning a plurality of stations to a channel (or subchannel), each with a different priority. A channel may be assigned to a first station with the first priority, a second station with a second priority, and so on (e.g., instead of assigning the channel to just one station). An access point may transmit information indicative of the channel assignments, priorities, and other information used by stations to perform uplink transmissions. If a station with the highest priority receives the data from the access point, it may start transmission. A station with a lower priority may listen, during a listening period, to the same channel and determine whether the higher priority station started transmission during the listening period. If the higher priority station did not start transmission during the listening period, the lower priority station may transmit uplink data to the access point.

16 Claims, 15 Drawing Sheets

(56) References Cited

U.S. PATENT DOCUMENTS

| | | | |
|---|---|---|---|
| 2013/0286959 A1* | 10/2013 | Lou | H04W 72/04 |
| | | | 370/329 |
| 2014/0003336 A1* | 1/2014 | Padden | H04W 72/10 |
| | | | 370/328 |
| 2015/0063191 A1 | 3/2015 | Merlin et al. | |
| 2015/0092703 A1* | 4/2015 | Xu | H04L 5/003 |
| | | | 370/329 |
| 2015/0117368 A1 | 4/2015 | Barriac et al. | |
| 2015/0172011 A1 | 6/2015 | Aboul-Magd et al. | |
| 2015/0245335 A1 | 8/2015 | Zhou et al. | |
| 2016/0302156 A1* | 10/2016 | Choi | H04W 52/146 |
| 2016/0330753 A1* | 11/2016 | Jauh | H04W 72/10 |
| 2016/0338097 A1* | 11/2016 | Andreoli-Fang | |
| | | | H04W 72/1284 |
| 2016/0338103 A1* | 11/2016 | Martin | H04W 74/08 |
| 2016/0345313 A1* | 11/2016 | Zhao | H04W 72/0446 |
| 2016/0366701 A1* | 12/2016 | Chu | H04W 74/0816 |
| 2017/0013655 A1* | 1/2017 | Martin | H04W 76/14 |
| 2017/0026872 A1* | 1/2017 | Lin | H04W 28/0289 |
| 2018/0206260 A1* | 7/2018 | Khoryaev | H04W 72/02 |
| 2018/0213521 A1* | 7/2018 | Martin | H04W 72/048 |

OTHER PUBLICATIONS

Jan. 2016—IEEE 802.11 Wireless LANs—Specification Framework for TGax.

Inan, Inanc, et al.; "Analysis of the 802.11e Enhanced Distributed Channel Access Function;" The Henry Samueli School of Engineering, University of California, Irvine, Mar. 28, 2008.

Aboul-Magf, Osama, et al; "Status of Project IEEE 802.11ax High Efficiency WLAN (HEW);" Feb. 22, 2016.

Burton, Marcus; "802.11 Arbitration;" Certified Wireless Network Professional; Sep. 2009.

Jan. 2016—IEEE P802.11 Wireless LANs—Proposed TGax Draft Specification.

IEEE 802.11e-2005 from Wikipedia—Feb. 27, 2016.

* cited by examiner

SPECTRUM EFFICIENCY FOR UPLINK WIRELESS COMMUNICATIONS

BACKGROUND

A wireless network having access points and one or more associated stations may operate in a multi-user environment, and the stations may communicate with the access points during uplink transmission opportunities. A single station may be assigned to a channel of the uplink transmission opportunity. In these situations, low spectrum efficiency may result if the station assigned to the channel does not transmit uplink data to the access point during the transmission opportunity.

BRIEF SUMMARY

This summary is provided to introduce a selection of concepts in a simplified form that are further described below in the Detailed Description. This Summary is not intended to identify key features or essential features of the various embodiments, nor is it intended to be used to limit the scope of the claims.

A wireless network having one or more access points and one or more stations may improve spectrum efficiency for uplink transmissions by assigning a channel (or subchannel) to a plurality of stations, each with a different priority. For example, a channel (or subchannel) may be assigned to a first station with the first priority, a second station with a second priority, and so on (e.g., instead of assigning the channel (or subchannel) to just one station). An access point may transmit, such as in a trigger, information indicative of the channel (or subchannel) assignments, priorities, and other information used by stations to perform uplink transmissions. If a station with the highest priority receives the trigger, it may start transmission after receiving the trigger. A station with a lower priority may also listen, during a listening period, to the same channel (or subchannel) and determine whether the higher priority station started transmission (or not) during the listening period. If the higher priority station did not start transmitting during the listening period, the lower priority station may then perform uplink transmission to the access point. Some aspects include apparatuses, methods, and computer readable media for transmitting and receiving data according to priority. Other aspects are discussed further below.

BRIEF DESCRIPTION OF THE DRAWINGS

Certain embodiments are illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
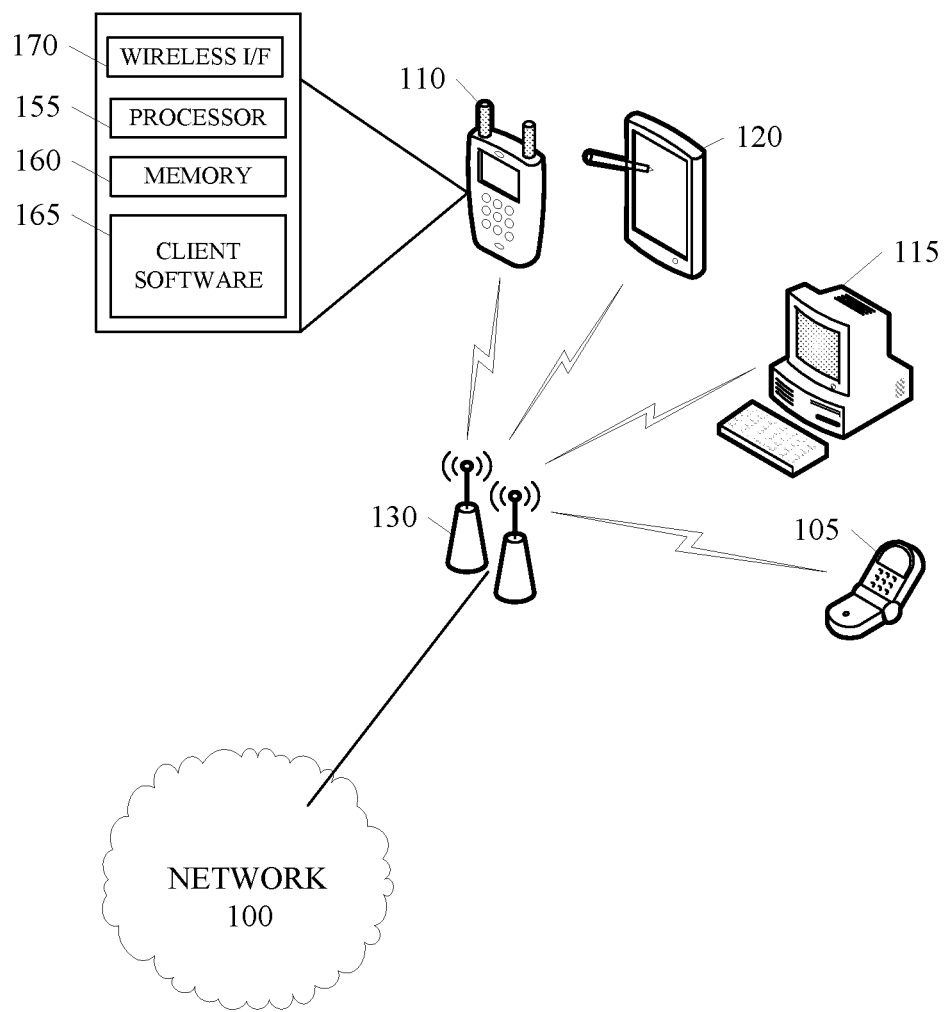
FIG. 1 is a block diagram of an example communication system in which one or more embodiments may be implemented.

In wireless random access network systems, such as a wireless local area network WLAN, for example defined by IEEE 802.11, medium access control (MAC) may be used to enable multiple users to share a common channel in a distributed manner through use of carrier sensing multiple access (CSMA). CSMA, however, is vulnerable to packet collision caused by hidden nodes, especially in a dense network environment. To resolve the hidden node problem, a collision protection mechanism known as RTS/CTS signaling has been used in the IEEE 802.11 family of standards as an option. For example, the fundamental throughput bottleneck of CSMA collision avoidance (CSMA-CA) being used in the current WLAN (e.g., IEEE 802.11 a/b/n/ac) is the excessive medium resource waste for the channel access. Various embodiments disclosed herein significantly improve channel resource usage in wireless random access networks and other networks by, among other things, prioritizing uplink data transmissions in wireless random access systems. FIG. 1 illustrates an example of one such system through which various embodiments may be practiced. As seen in FIG. 1, the system may include an access node (e.g., access point (AP)) 130 and a number of wireless stations (STAs) 105, 110, 115, and 120.

Orthogonal frequency division multiplexing access (OFDMA) may be used in a system for multiplexing wireless devices for uplink data transmissions. In OFDMA systems, a frequency spectrum is divided into a plurality of closely spaced narrowband orthogonal subcarriers. The subcarriers are then divided into mutually exclusive groups called subbands, with each subband (also referred to as subchannels) assigned to one wireless device or multiple wireless devices. According to various aspects, subcarriers may be assigned to different wireless devices. OFDMA has been adopted in synchronous and cellular systems, including 4G broadband wireless standards (e.g. Long-Term Evolution (LTE)) and IEEE 802.16 family standards.

Returning to FIG. 1, the STAs may include, for example, a mobile communication device 105, mobile phone 110, personal digital assistant (PDA) or mobile computer 120, computer work station (for example, personal computer (PC)) 115, or other portable or stationary device having a wireless interface capable of communicating with an access node (e.g., access point) 130. The STAs in the system may communicate with a network 100 or with one another through the AP 130. Network 100 may include wired and wireless connections and network elements, and connections over the networks may include permanent or temporary connections. Communication through the AP 130 is not limited to the illustrated devices and may include additional mobile or fixed devices. Such additional mobile or fixed devices may include a video storage system, an audio/video player, a digital camera/camcorder, a positioning device such as a GPS (Global Positioning System) device or satellite, a television, an audio/video player, a tablet computer, a radio broadcasting receiver, a set-top box (STB), a digital video recorder, a video game counsel, a remote control device and the like.

While one AP 130 is shown in FIG. 1, the STAs may communicate with multiple APs 130 connected to the same network 100 or multiple networks 100. Also, while shown as a single network in FIG. 1 for simplicity, network 100 may include multiple networks that are interlinked so as to provide internetworked communications. Such networks may include one or more private or public packet-switched networks, for example the Internet, one or more private or public circuit-switched networks, for example a public switched telephone network, a satellite network, one or more wireless local area networks (e.g., 802.11 networks), one or more metropolitan area networks (e.g., 802.16 networks), and/or one or more cellular networks configured to facilitate communications to and from the STAs through one or more APs 130. In various embodiments, an STA may perform the functions of an AP for other STAs.

Communication between the AP and the STAs may include uplink transmissions (e.g., transmissions from an STA to the AP) and downlink transmissions (e.g., transmissions from the AP to one or more of the STAs). Uplink and downlink transmissions may utilize the same protocols or may utilize different protocols. For example, in various embodiments STAs 105, 110, 115, and 120 may include software 165 that is configured to coordinate the transmission and reception of information to and from other devices through AP 130 and/or network 100. In one arrangement, client software 165 may include specific protocols for requesting and receiving content through the wireless network. Client software 165 may be stored in computer-readable memory 160 such as read only, random access memory, writeable and rewriteable media and removable media and may include instructions that cause one or more components—for example, processor 155, wireless interface (I/F) 170, and/or a display—of the STAs to perform various functions and methods including those described herein. AP 130 may include similar software 165, memory 160, processor 155 and wireless interface 170 as the STAs. Further embodiments of STAs 105, 110, 115, and 120 and AP 130 are described below with reference to FIG. 11.

Any of the method steps, operations, procedures or functions described herein may be implemented using one or more processors and/or one or more memory in combination with machine executable instructions that cause the processors and other components to perform the method steps, procedures or functions. For example, as further described below, STAs (e.g., devices 105, 110, 115, and 120) and AP 130 may each include one or more processors and/or one or more memory in combination with executable instructions that cause each device/system to perform operations as described herein.

Figure 2:
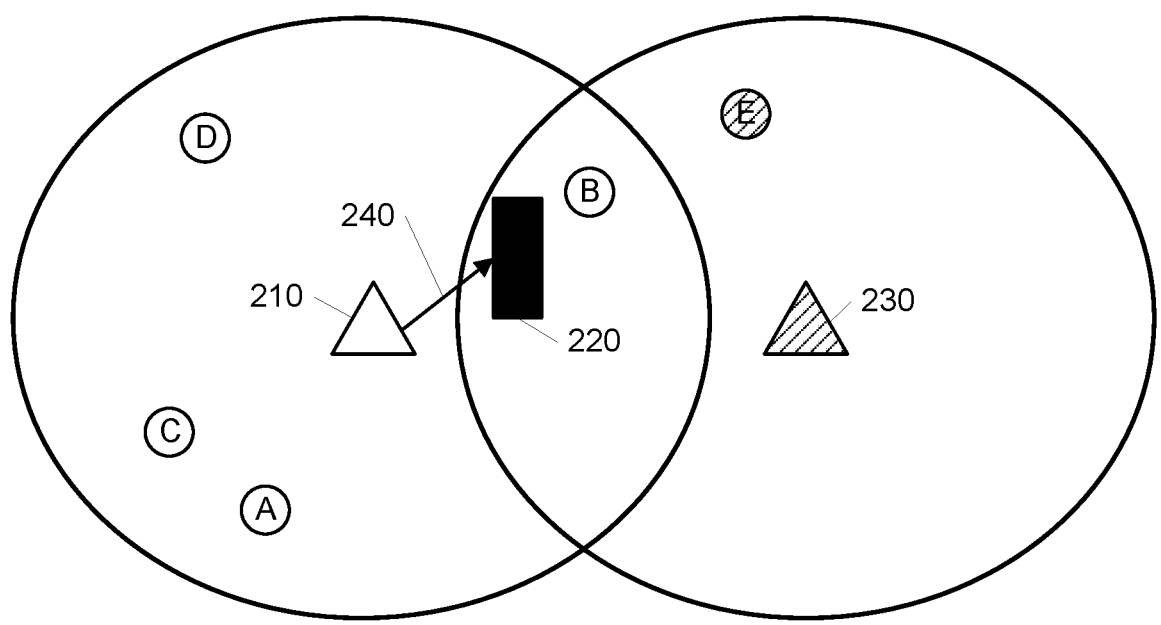
FIG. 2 is a block diagram of an example communication system in which one or more embodiments may be implemented.

FIG. 2 is a block diagram of an example communication system in which one or more embodiments may be implemented. The communication system may comprise one or more APs 210 and 230 and one or more STAs (e.g., STAs A, B, C, D, and E). The APs and STAs may be grouped, such as in service sets (e.g., a basic service set (BSS)), so that each STA is associated with one or more AP or network. For example, a first service set may comprise AP 210 and its four associated STAs A, B, C, and D, and a second service set may comprise AP 230 and STA E.

An AP (e.g., AP 210 or 230) may schedule uplink (UL) multi-user (MU) transmissions, and each STA may transmit data to one of the APs 210 or 230 in the UL case. The UL transmissions (e.g., UL OFDMA or UL MU-MIMO) may occur during one more transmission opportunities (e.g., TXOPs). For example, AP 210 may select STAs A, B, C, and D to send UL data during an OFDMA-based TXOP. One or more of the STAs may transmit UL data in response to receiving a trigger, such as a trigger frame (TF), from the AP 210 or the AP 230. For example, AP 210 may send in a TF information comprising, for example, identifiers for the associated STAs (e.g., association IDs (AIDs)), allocated subchannels, etc.). STAs A, C, and D may receive the TF from AP 210 and start UL transmission in response to receiving the TF.

In some instances, an STA (e.g., STA B) might not receive a trigger from an AP (e.g., AP 210). STA B might not receive the trigger for various reasons. An obstacle 220 may impact (e.g., shadow) a transmission 240 of a trigger intended for STA B. The trigger may be corrupted at STA B due to, for example, low channel quality or fading (e.g., deep channel fading) between the AP 210 and STA B. An STA might receive the trigger, but might not be able to determine the channel or subchannel that was allocated to the STA. Similarly, the STA may fail to receive other parameters that are used for UL transmission to the AP, such as an identity of the STA or a duration of the TXOP. In some aspects, the STA's modem may be busy with other communication, and the STA might not be able to decode the trigger frame. In yet other examples, an STA may have its network allocation vector (NAV) set from an overlapped basic service set (OBSS) to a duration longer than the interframe space (IFS), which may come after the TF. This may occur if an STA receives a PHY header from another BSS. The other BSS may be detected by, for example, a color bit in the header, and each BSS may have its own color. The STA may consider updating NAV if the color is different, or it may adjust sensing level higher. Accordingly, the STA might not be able to transmit data in the UL to the AP.

In each of the above examples, low or inefficient spectrum usage may result if an STA (e.g., STA B) has been allocated an $i^{th}$ channel or subchannel for UL TXOP (e.g., for AP 210), but the STA does not receive a trigger frame from the AP or receives the trigger frame in corrupted format. That is, one or more channels or subchannels might remain unused if the STA did not properly receive the trigger frame indicating that the STA has been assigned the UL TXOP. Even lower spectrum efficiency may result if multiple STAs (in multiple TXOPs) miss their TFs.

Figure 3:
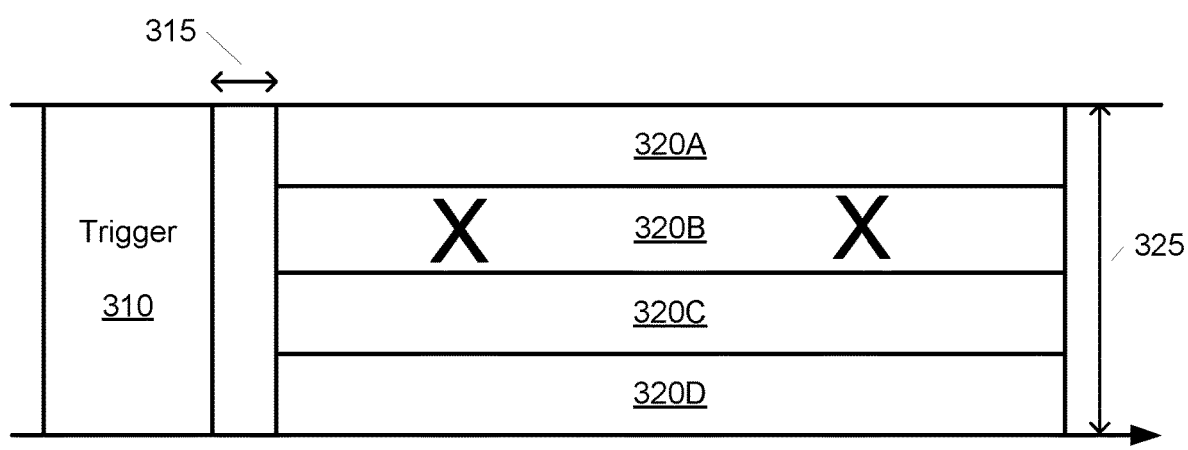
FIG. 3 illustrates an example of transmitting and receiving data according to one or one or more embodiments described herein.

FIG. 3 illustrates an example of transmitting and receiving data according to one or one or more embodiments described herein. An AP, such as AP 210 illustrated in FIG. 2, may send a trigger 310, such as a trigger frame, to a one or more STAs, such as STAs A, B, C, and D. Each STA that properly receives the trigger 310 may wait a predetermined amount of time 315 before responding to the trigger 310 by, for example, sending UL data to the AP 210. The time delay 315 may comprise an amount of time for the STAs to process and respond to information received in the trigger 310. The time delay 315 may also comprise the STA's sensing time. For example, the time delay 315 may comprise an interframe space (IFS). FIG. 3 illustrates an example where STAs A, C, and D received the trigger 310 and accordingly each send UL data 320A (STA A), 320C (STA C), and 320D (STA D) to the AP 210. The UL data may be transmitted on one or more frequency channels or subchannels (e.g., frequency band, OFDMA subchannel, etc.), which may be assigned one or more frequency bandwidths 325, such as 20 MHz. On the other hand, STA B might not have properly received the trigger 310, and therefore might not send UL data 320B to AP 210. The information received in the trigger frame may comprise management information. The trigger frame may exclude payload data.

To enhance the spectrum efficiency for UL transmissions, a network component (e.g., an AP) may assign a channel or subchannel to a plurality of STAs, each with a different priority. For example, the subchannel (e.g., 320B) assigned to STA B to communicate with AP 210 may be assigned to two or more STAs, instead of just STA B. Multiple assignments for each of the other subchannels (e.g., 320A, 320C, and 320D) may similarly be made. As described above, the AP may transmit a trigger 310, and the trigger 310 may carry information indicating the subchannel assignments and other information used by STAs to perform UL transmissions (e.g., priority information, such as each STA's priority). If an STA with the highest priority receives the trigger 310, it may start transmission after the trigger 310 (e.g., after waiting for a specified IFS duration 315). An STA with a lower priority may also listen to the same subchannel, during a listening (e.g., sensing) period, and determine whether the higher priority STA started transmission or not during the listening period. If the lower priority STA determines that the subchannel is free (e.g., the higher priority STA did not start transmission during the listening period), the lower priority STA may assume that the higher priority STA did not receive the trigger 310, and the lower priority STA may start UL transmission to the AP. If, on the other hand, the lower priority STA determines that the higher priority STA did start transmission on the subchannel, the lower priority STA may prevent transmission of data to the AP. These concepts may be expanded to more than two STAs, as will be described in further detail in the examples below.

Figure 4A:
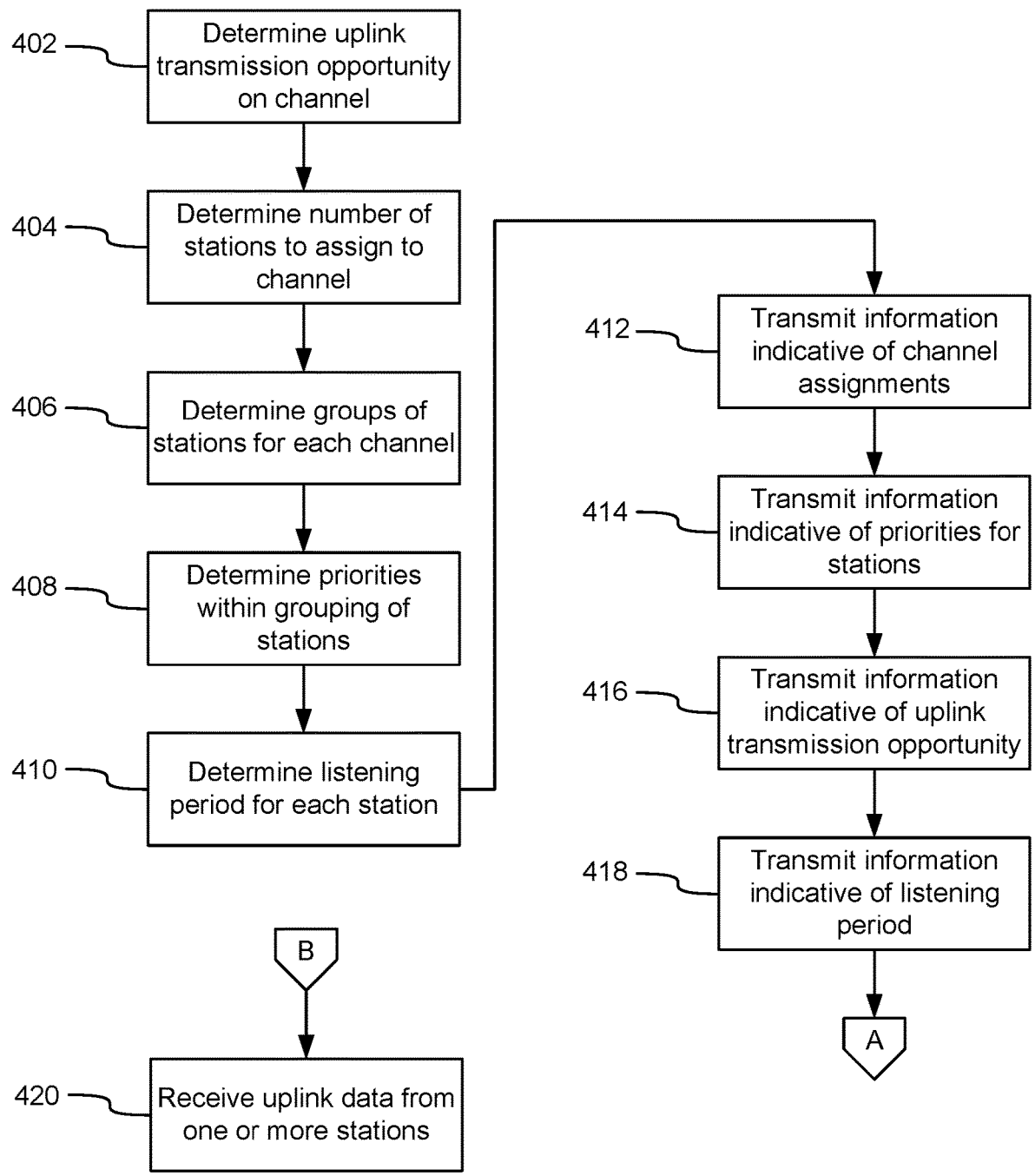
FIG. 4A illustrates an example method for improving spectrum efficiency for wireless communications according to one or more embodiments described herein.

FIG. 4A illustrates an example method for improving spectrum efficiency for wireless communications according to one or more embodiments described herein. One or more steps illustrated in FIG. 4A may be performed by one or more computing devices, such as an access point (e.g., AP 130 illustrated in FIG. 1, AP 210 or AP 230 illustrated in FIG. 2, or AP 1010 illustrated in FIG. 10) or other network devices in the network 100. However, for the sake of brevity, the steps illustrated in FIG. 4A will be described as being performed by an access point. Some of the steps illustrated in FIG. 4A may be optional.

In step 402, the access point may determine a reservation period, such as an uplink (UL) transmission opportunity (TXOP). The UL TXOP may be used by one or more STAs to transmit UL data to the AP, and one or more channels or subchannels may be used for UL transmission during the TXOP. Moreover, the UL TXOP may be scheduled to occur within a frequency band (e.g., a 20 MHz band) and/or a time band.

In step 404, the access point may determine a number of stations N to assign to the same channel(s) or subchannel(s) during the transmission opportunity. The number of stations N to assign to a given subchannel may be predefined, such as two stations or three stations per subchannel. A small number for N (e.g., N=1) may result in higher power efficiency because other stations might not listen for UL transmissions or otherwise perform spectrum sensing during a listening period. A small number for N may also lower the probability of data collisions (e.g., the possibility of having two stations that cannot hear each other and therefore both transmit on the same channel). A larger number for N, on the other hand, may improve the spectrum efficiency or usage. The number for N may be the same for each subchannel or might be different from subchannel to subchannel.

The access point may determine N based on one or more factors. The access point may consider power budget for one or more of the stations. For example, the access point may prevent STAs having restricted power budgets (e.g., Internet of Things (IoT) devices, STAs in power save modes, etc.) from having to listen for UL transmissions from higher priority STAs because lower priority STAs may perform spectrum sensing for a long duration without access. That is, the access point may assign STAs with restricted power budgets as the highest (or higher) priority STA, but not the lowest (or lower) priority STA. As will be described in further detail below, lower priority STAs may perform spectrum sensing for a longer duration than higher priority STAs.

The access point may determine N based on the duration of the TXOP. In general, longer TXOPs can accommodate more STAs with different priorities than shorter TXOPs because longer TXOPs may sustain longer preambles for STAs to listen for transmissions from higher priority STAs. For example, N may be greater for longer TXOPs than for shorter TXOPs. The access point may set or otherwise know from the network 100 the exact duration of the TXOP (and which may be indicated in the TF). The AP may determine the average value of STAs' transmission durations ($T_a$) (e.g., based on previous transmissions by STAs). The AP may determine N according to the relation between the TXOP duration and $T_a$. As the TXOP duration increases compared to $T_a$, the AP may increase N, and vice versa.

In some aspects, the AP may fix the value of N. For example, the AP may determine N to be 2 or 3 because the probability that more than three STAs miss the same trigger for a given subchannel may be relatively low (e.g., below a predetermined threshold). Additionally or alternatively, the AP may determine N according to, for example, a lookup table. An example of a lookup table is provided as follows:

| N | Condition |
|---|---|
| 2 | Condition 1: relatively good average channel quality (e.g., channel quality above a predetermined threshold, such as BER < $BER_{threshold}$), relatively short TXOP duration (e.g., TXOP duration < $T_{threshold}$), etc. |
| 3 | Condition 1: relatively bad average channel quality (e.g., channel quality below a predetermined threshold, such as BER > $BER_{threshold}$), relatively long TXOP duration (e.g., TXOP duration > $T_{threshold}$), etc. |

In step 406, the access point may determine groups of stations for each of the channels or subchannels. STAs may be assigned to the same group if they are capable of listening to UL data transmissions made by other STAs in the group. For example, an STA may be assigned to a group based on its proximity to other STAs in the same group (e.g., based on bearing and distance from AP, GPS coordinates, and the like).

Figure 10:
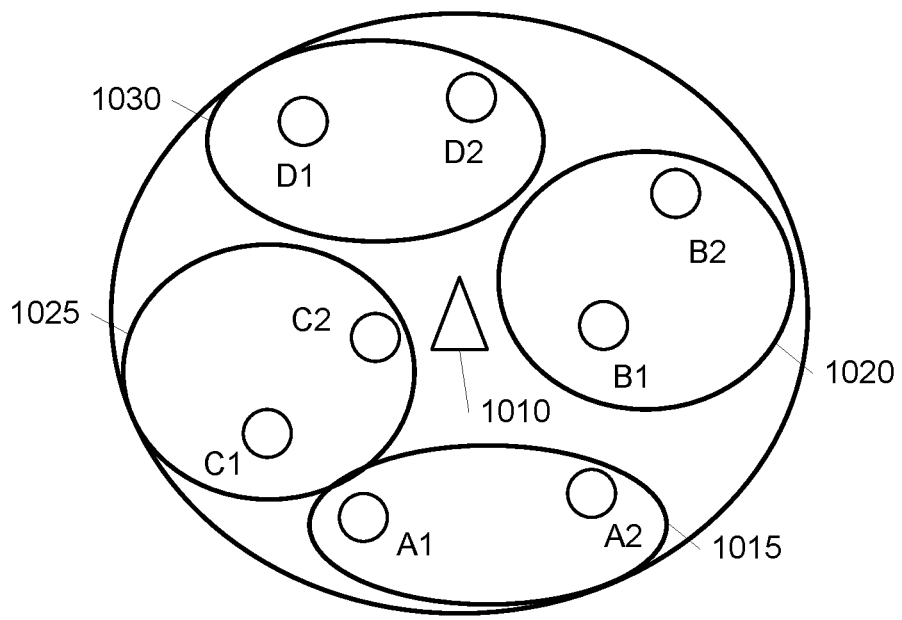
FIG. 10 is a block diagram of an example communication system in which one or more embodiments may be implemented.

FIG. 10 is a block diagram of an example communication system (e.g., with a plurality of groups of stations determined in step 406) in which one or more embodiments may be implemented. An AP 1010 may allocate a subchannel to a set of STAs in proximity of each other. Accordingly, the AP 1010 can have a high probability that STAs assigned to a given subchannel are not hidden from (e.g., cannot hear) each other. For example, the AP 1010 may assign STAs A1 and A2 to a first group 1015, STAs B1 and B2 to a second group 1020, STAs C1 and C2 to a third group 1025, and STAs D1 and D2 to a fourth group 1030. The number N of STAs assigned to each subchannel may be the same (e.g., N=2, as illustrated in FIG. 10), or the number N may differ from group to group (e.g., N=2 for a first group, N=3 for a second group, N=2 for a third group, etc.).

In order to determine groups based on proximity, the AP 1010 may estimate the transmission direction of different STA's packets (e.g., in an authentication or association phase, in previous transmissions, etc.). The AP 1010 may build a profile for STA's locations based on the transmission directions. The profile may be updated (e.g., frequently) to take into account the mobility of STAs. Several techniques may be used to estimate the direction-of-arrival (DOA) of signals received by the AP 1010, and the AP 1010 may be equipped with multiple antennas to determine the direction-of-arrival. The AP 1010 may additionally or alternatively estimate the distance between the AP 1010 and each STA based on transmissions to or from the STA.

Transmission collisions may occur if groups are not properly determined. For example, assume that the AP 1010 assigns STA A2 (e.g., priority 1) and STA D1 (e.g., priority 2) to the same subchannel. If STA A2 correctly received the trigger and starts transmitting its data packet in the UL to the AP 1010, STA D1 might sense the subchannel and incorrectly determine that STA A2 did not start transmitting to AP 1010 because of the distance between STA A2 and STA D1. STA D1 may decide that the subchannel is idle and may start transmission after the listening period. STA D1's UL transmission may collide with STA A2's transmission at the AP 1010. This situation may be avoided upon proper group assignments by the AP 1010.

Returning to FIG. 4A, in step 408, the access point may determine station priorities within each group of stations. Each STA may be assigned a certain priority ($P_1, P_2, \ldots, P_N$) that indicates its priority within its group. An exemplary assignment of priorities for four subchannels is provided in the following table:

| Subchannel | Assigned STAs (Priority) |
|---|---|
| 1 | A1 (1), A2 (2), A3 (3) |
| 2 | B1 (1), B2 (2), B3 (3) |
| 3 | C1 (1), C2 (2), C3 (3) |
| 4 | D1 (1), D2 (2), D3 (3) |

The access point may consider several factors for assigning priorities. One factor affecting the assignment mechanism may be fairness. STAs with higher priorities may have higher chances of using the subchannel compared to STAs with lower priorities because STAs with lower priorities might only be able to access the subchannel if STAs with higher priorities have missed the trigger from the AP. To take this factor into account, the AP may keep track of each STA's channel usage or share of the communication medium (e.g., how many transmissions/receptions the STA made in the last X seconds) and assign priorities accordingly.

Another factor may be the Quality of Service (QoS), such as the transmission/reception delay/latency. The AP may prioritize STAs in a given subchannel according to, for example, an enhanced distributed channel access (EDCA) mechanism (e.g., as defined in IEEE 802.11e). In EDCA, applications may be categorized into different access categories (ACs). Each AC may have a different priority of using the spectrum, which may be reflected in different issues, such as contention window minimum (CWmin) and contention window maximum (CWmax) values. For example, default values of CWmin=15 and CWmax=1023 may be used as in 802.11a and 802.11n. The resulting values for different ACs are shown in the following table:

| Access categories (AC) | CWmin | CWmax |
|---|---|---|
| Background | 15 | 1023 |
| Best effort | 15 | 1023 |
| Video | 7 | 15 |
| Voice | 3 | 7 |

Using the EDCA concept, the AP may assign priorities to different STAs according to the following table:

| Access categories (AC) | Priority |
|---|---|
| Background | 3 |
| Best effort | 3 |
| Video | 2 |
| Voice | 1 |

That is, voice data may be prioritized above video data, which may be prioritized above best effort data and background data. In some aspects, the access point may take both factors (e.g., fairness and QoS) into consideration for determining priorities, as will be described in further detail in the examples below.

Figure 4B:
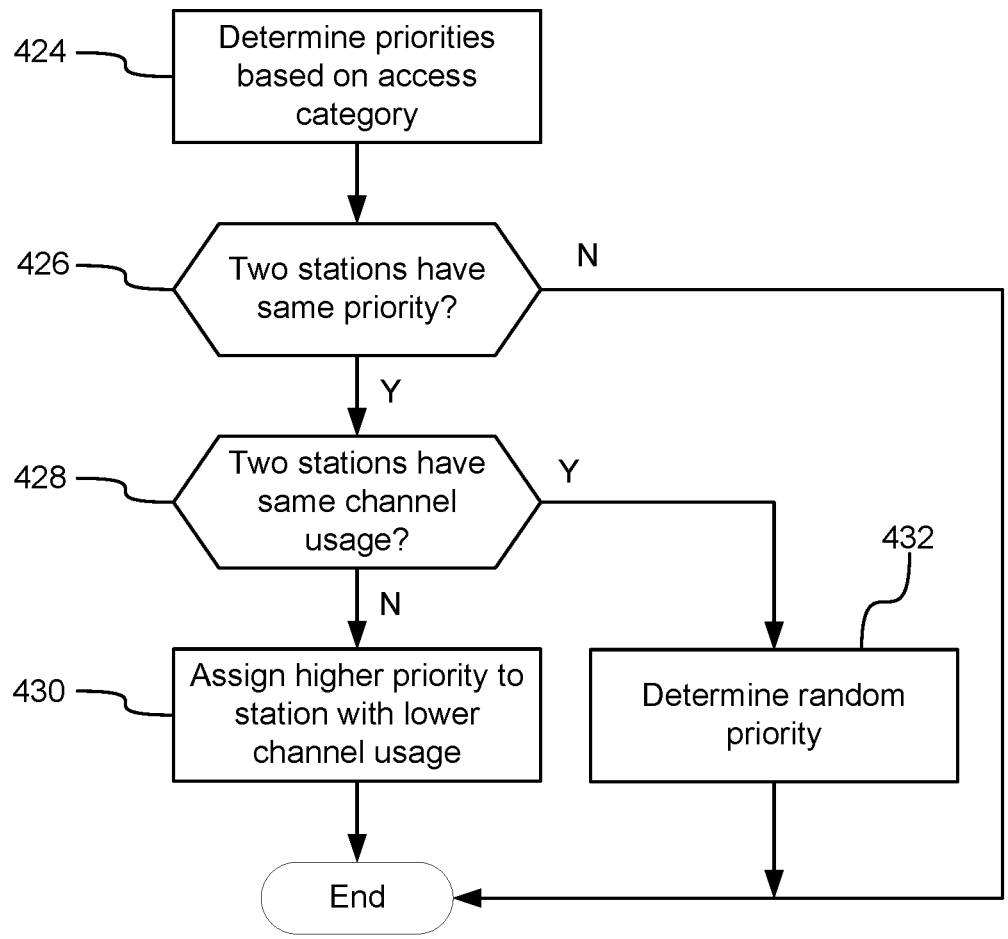
FIG. 4B illustrates an example method for determining transmission priorities for two stations according to one or more embodiments described herein.

FIG. 4B illustrates an example method for determining transmission priorities (e.g., step 408) for two stations (e.g., if there are two stations in a particular group) according to one or more embodiments described herein. Some of the steps illustrated in FIG. 4B may be optional. In step 424, the access point may determine priorities based on access categories, such as the access categories indicated in the above table. In step 426, the access point may determine whether the two stations have the same priority. If not (step 426: N), the access point may complete its process for determining priorities for that particular group. For example, a voice traffic STA may be prioritized over a video traffic STA. As another example, a video traffic STA may be prioritized over a best effort traffic STA. On the other hand, if two stations have the same priority (step 426: Y), the access point may proceed to step 428 to distinguish between the two stations. For example, both stations may fall within the voice access category (e.g., priority 1) or the video access category (e.g., priority 2). As another example, one station may fall within the best effort category (e.g., priority 3) and the second station may fall within the background category (e.g., priority 3).

In step 428, the access point may determine whether the two stations have the same channel usage. As previously explained, the access point may determine each stations channel usage based on, for example, the number of transmissions or receptions each stations was able to make in the past X seconds. If the two stations have the same channel usage (step 428: Y), the access point may proceed to step 432 to determine a random priority for each of the stations, such as via a randomization algorithm. Randomization may comprise comparing the station's MAC addresses (or other unique device identifier). In some aspects, a station with a smaller MAC address may be assigned a higher priority (or vice versa). If the two stations do not have the same channel usage (step 428: N), the access point may proceed to step 430.

In step 430, the access point may assign (e.g., re-assign) a higher priority to the station having the lower channel usage (e.g., fewer transmissions and/or receptions relative to the other station). Accordingly, that station may have an opportunity to transmit UL data to the access point before the station that has had more transmissions and/or receptions. Similarly, the access point may assign a lower priority to the station having the higher channel usage.

Figure 4C:
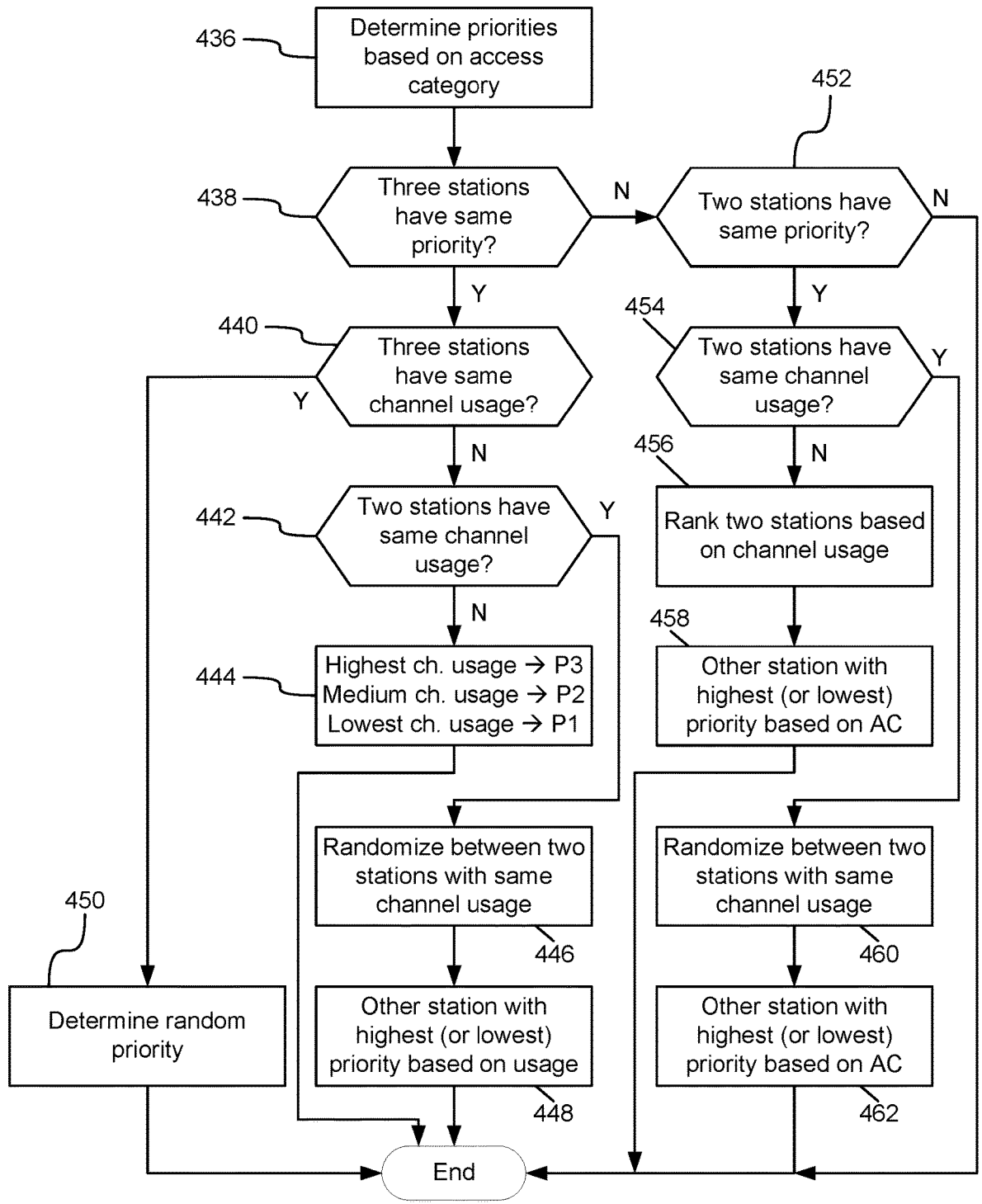
FIG. 4C illustrates an example method for determining transmission priorities for three stations according to one or more embodiments described herein.

FIG. 4C illustrates an example method for determining transmission priorities (e.g., step 408) for three stations (e.g., if there are three stations in a particular group) according to one or more embodiments described herein. Some of the steps illustrated in FIG. 4C may be optional. In step 436, the access point may determine priorities based on access category for each of the three stations. In step 438, the access point may determine whether the three stations have the same priority. If so (step 438: Y), the access point may proceed to step 440.

In step 440, the access point may determine whether the three stations have the same channel usage. If so (step 440: Y), the access point may proceed to step 450 and determine random priorities for the three stations. If not (step 440: N), the access point may determine that at least one of the stations has a different channel usage than the other stations and proceed to step 442.

In step 442, the access point may determine whether two stations have the same channel usage. If not (step 442: N), the access point may determine that all three of the stations have different channel usages and may proceed to step 444 to determine priorities. In step 444, the access point may assign the lowest relative priority (e.g., P3) to the station having the highest channel usage, the middle relative priority (e.g., P2) to the station having the middle channel usage, and the highest relative priority (e.g., P1) to the station having the lowest channel usage. Returning to step 442, if two stations have the same channel usage (step 442: Y), the access point may proceed to step 446.

In step 446, the access point may randomize the priorities between the two stations having the same channel usage. The access point may proceed to step 448 to determine the priority for the station having a channel usage different from the channel usage of the other two stations. If the station has a higher channel usage than the two other stations, the first station may be assigned the lowest priority of the three stations. If the station has a lower channel usage than the two other stations, the first station may be assigned the highest priority of the three stations.

Returning to step 438, if the access point determines that all three stations do not have the same priority (step 438: N), the access point may proceed to step 452. In step 452, the access point may determine whether two stations have the same priority. If two stations do not have the same priority (step 452: N), the access point may maintain the priorities determined based on access categories. On the other hand, if two stations have the same priority (step 452: Y), the access point may proceed to step 454.

In step 454, the access point may determine whether the two stations having the same priority have the same channel usage. If not (step 454: N), the computing device may proceed to step 456 and rank the two stations based on channel usage. For example, the station having the lower channel usage may be assigned a higher priority than the station having the higher channel usage. The access point may proceed to step 458 and determine the priority of the third station having the different access category. That is, the access point may compare the access category of the third station with the common access category priority of the other two stations and determine the third station's priority based on the comparison.

Returning to step 454, if the access point determines that the two stations having the same priority (based on access category) have the same channel usage (step 454: Y), the access point may proceed to step 460. In step 460, the access point may randomize the priority between the two stations having the same channel usage. The access point may proceed to step 462 and determine the priority of the third station having the different access category. That is, the access point may compare the access category of the third station with the common access category priority of the other two stations and determine the third station's priority based on the comparison.

Returning to FIG. 4A, in step 410, the access point may determine the listening period T (e.g., a duration of a sensing period) for each station or group of stations. In some aspects, the listening period $T_2$ for a second priority station may comprise a predetermined value, such as 34 microseconds. The listening period $T_3$ for a third priority station may be longer than the listening period T for the second priority station (e.g., $2*T_2$, or 68 microseconds).

Figure 6:
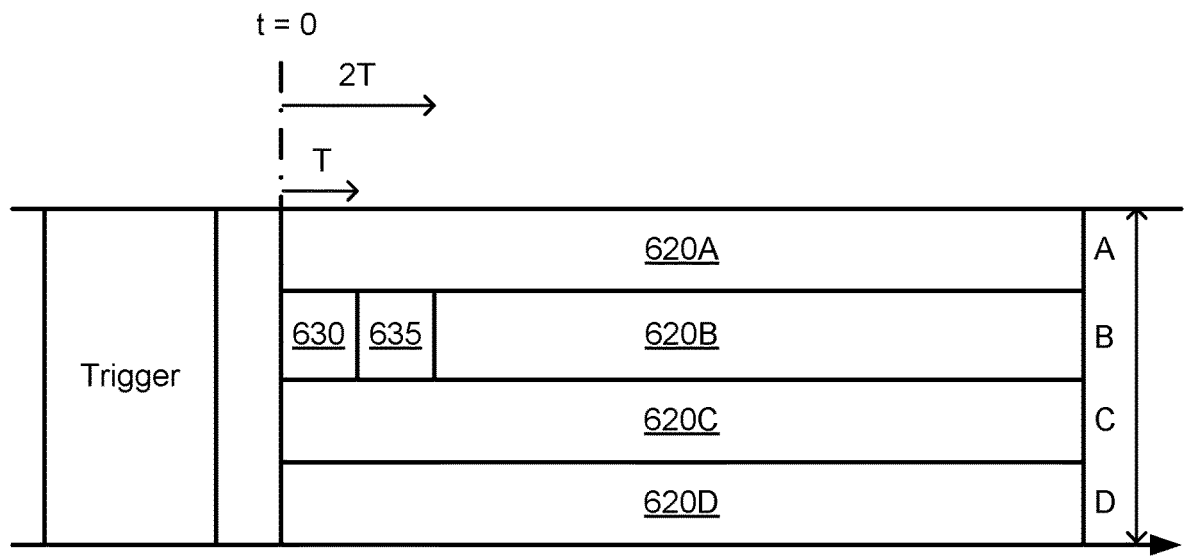
FIG. 6 illustrates an example of transmitting and receiving data according to one or one or more embodiments described herein.

FIG. 6 illustrates an example of transmitting and receiving data according to one or one or more embodiments described herein. In this example, the access point may assign a first subchannel A to STA A, a third subchannel C to STA C, and a fourth subchannel D to STA D. STA A may start transmitting 620A in subchannel A after receiving the trigger from the access point (and after the IFS). STA C may similarly start transmitting 620C in subchannel C after receiving the trigger, and STA D may start transmitting 620D in subchannel D after receiving the trigger. In the example illustrated in FIG. 6, if one of STAs A, C, or D does not properly receive the trigger, the corresponding subchannel might not be used during the TXOP, resulting in inefficient spectrum usage.

On the other hand, the access point may assign the second subchannel B to three STAs, such as STA B1 (e.g., with priority 1), STA B2 (e.g., with priority 2), and STA B3 (e.g., with priority 3). At time t=0 (e.g., immediately after the IFS), STA B1 with priority $P_1$ may start transmitting 620B UL data in the assigned subchannel if STA B1 receives the trigger from the access point, such as a time t=0 or sometime thereafter. At the same time (e.g., at t=0), STA B2 with priority $P_2$ may start sensing 630 for a duration of T (e.g., 34 microseconds). In some aspects, the duration of T may be defined as a multiple of a length of an OFDM symbol. If, by the end of T, no activity from STA B1 with priority $P_1$ was detected by STA B2 with priority $P_2$, STA B2 may start transmitting 620B in the assigned subchannel, such as at the end of the listening duration T or sometime thereafter.

At t=0, STA B3 with priority $P_3$ may start sensing 630 and 635 for a duration of 2T (e.g., 68 microseconds). If, by the end of 2T, no activity from STA B1 or STA B2 was detected by STA B3, STA B3 may start transmitting 620B in the assigned subchannel, such as at the end of the listening duration 2T or sometime thereafter. On the other hand, if either STA B1 or STA B2 starts UL transmission during the STA B3's listening period, STA B3 might not transmit UL data to the access point because STA B3 has a lower priority than both STA B1 and STA B2. Moreover, STA B3 might not listen for the entire duration of 2T if it determines that STA B1 or STA B2 started UL transmissions. Instead, STA B3 might stop listening when it makes that determination, and may enter into a standby mode. While FIG. 6 illustrates an example with three STA Bs assigned to a subchannel, other numbers of STA Bs (e.g., two, four, five, etc.) may instead be assigned to the subchannel. The listening duration for each STA having priority i may be, for example, (i−1)*T.

Part of determining the listening period for each station may comprise the access point setting the listening duration (and consequentially the UL transmission duration, which may be reduced by the listening duration) for each station in order to synchronize the UL transmissions among each of the subchannels.

Figure 7:
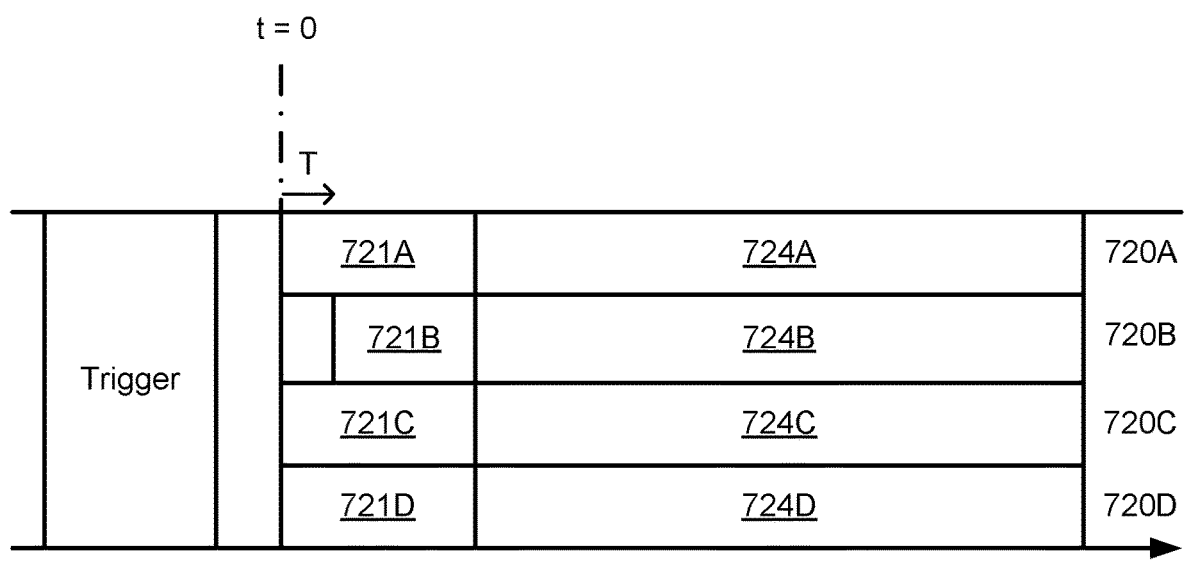
FIG. 7 illustrates an example of transmitting and receiving data according to one or one or more embodiments described herein.

FIG. 7 illustrates an example of transmitting and receiving data according to one or one or more embodiments described herein, such as to synchronize data (e.g., UL OFDMA) transmissions. For example, the access point may determine a duration T (or 2T, or 3T, etc.) such that actual UL transmissions on each subchannel start at the same time, even if a lower priority station (rather than the first priority station) uses a particular subchannel. In some aspects, UL data transmissions may be delayed in each subchannel in order to allow synchronized transmissions.

A brief example of synchronization will be described with reference to FIG. 7, with additional details below. Each subchannel (e.g., subchannels 720A, 720B, 720C, and 720D) may comprise a time for stations having corresponding first priorities on each channel to transmit a preamble (e.g., preambles 721A, 721B, 721C, and 721D). The access point may shorten the time to transmit the preamble for the stations having a second priority (e.g., STA B2 transmitting 721B) relative to the preambles for the other subchannels, such as by a duration T. Accordingly, if STA B2 transmits UL data to the access point on subchannel 720B after it does not sense that STA B1 transmitted UL data on subchannel 720B, it may transmit a shorter preamble, such that the payload data sent from each of the stations on their respective subchannels begins (and/or ends) at the same time.

The preamble for STA B2 (or any lower priority STA) may be shortened by, for example, shortening a short training field (STF) of the preamble. That is, the length of the STF for an STA's UL transmission may be based on the STA's priority. For example, the STF may be calculated as follows:

STF(i)=STF+(N−i)*T

STF(i) may comprise the STF duration of an STA with priority $P_i$. STF may comprise a baseline STF duration, such as 8 microseconds. N may comprise the number of STAs assigned to a particular subchannel. T may comprise the listening duration as described above, e.g., such that an STA can reliably decide whether the higher priority STA has begun transmitting or not. For example, T may be set to 34 microseconds.

Figure 8:
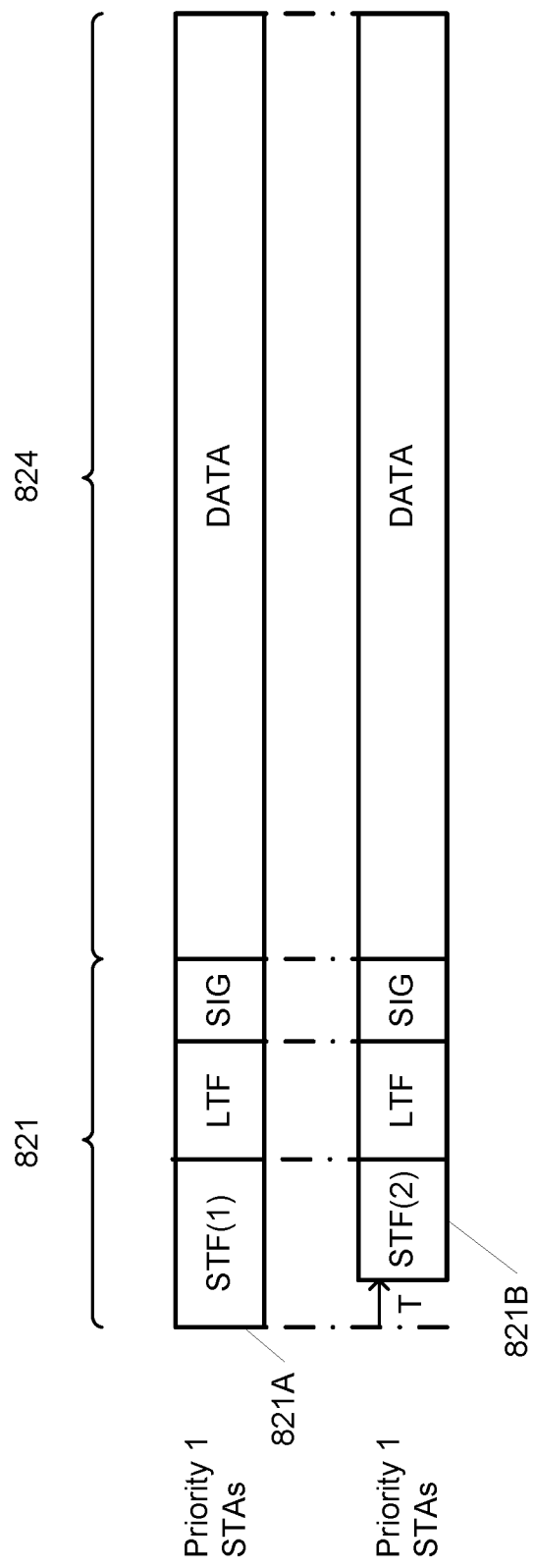
FIG. 8 illustrates an example data structure according to one or one or more embodiments described herein.

FIG. 8 illustrates an example data structure, such as for one or more UL transmissions, according to one or one or more embodiments described herein. A transmission (e.g., one or more packet) may comprise a preamble 821 that is followed by payload data 824. The preamble 821 may contain information used by the receiver of the data to decode the payload data 824. As previously described, the preamble 821 may include an STF, such as STF 821A or STF 821B, and a baseline STF may be 40 microseconds long. For example, the STF may contain 10 repetitions of a 4 microsecond symbol. Uses of the STF may include start of packet detection, automatic gain control (AGC), initial frequency offset estimation, initial time synchronization, etc.

The preamble 821 may also include a long training field (LTF). The LTF may be 8 microseconds in length (e.g., 2 OFDM symbols). The LTF may be used for channel estimation, more accurate frequency offset estimation, more accurate time synchronization, etc. The preamble 821 may also include a signal field (SIG). The SIG may be 4 microseconds in length (e.g., 1 OFDM symbol). The SIG may contain packet information to configure the receiver, such as rate (e.g., modulation and coding scheme (MCS)), length (e.g., amount of data being transmitted in, for example, octets), parity (e.g., giving the even parity over the first 17 bits), a tail (e.g., which may be set to zero and used to flush the encoder and decoder because the SIG might be separately encoded from the data field), among other information.

In FIG. 8, the STFs may be adjusted based on a particular STA's priority, as explained above. STAs with higher priority may use longer STFs, such that each STA transmitting during the TXOP starts transmitting the LTF at the same time. For example, STF 821A for an STA having a first priority may be longer than the STF 821B of an STA having a second, lower priority. The difference in length between STF 821A and 821B may be a listening duration T, as illustrated in FIG. 8, or it may be some other value calculated by the access point to synchronize data.

In some aspects, a lower priority STA may start to listen for a higher priority STA's preamble (e.g., during the duration T). In response to a preamble (or N symbols of that preamble, where N may be a design parameter) being received correctly (e.g., based on the known bit pattern in the training sequence) or in response to detecting enough energy (e.g. over current clear channel assessment (CCA) value) on the subchannel, the lower priority STA does not start UL transmission. Otherwise (and as explained above), the lower priority STA may start the UL transmission at the symbol in MU UL transmission that is aligned with the other STAs. The starting point may be computed using the trigger frame. In alternative aspects, the lower priority STA may start the UL transmission at a point where the higher priority MAC header would have been started.

Figure 9:
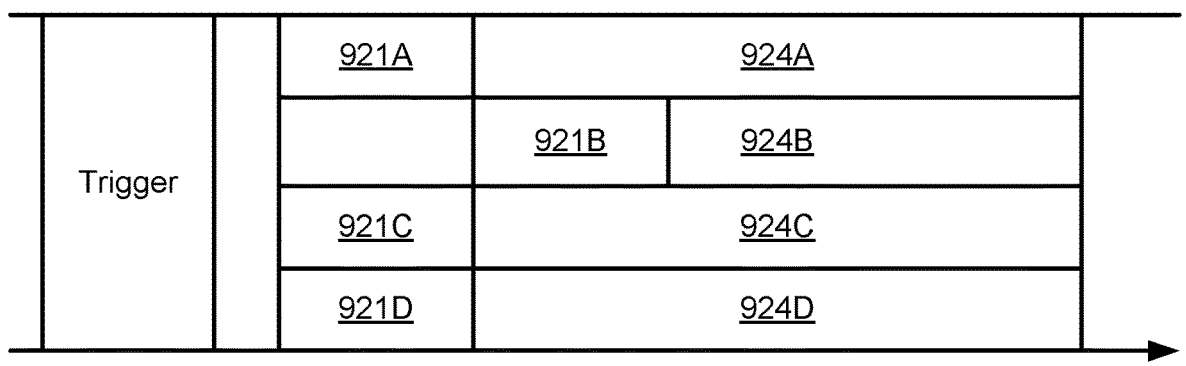
FIG. 9 illustrates an example of transmitting and receiving data according to one or one or more embodiments described herein.

FIG. 9 illustrates an example of transmitting and receiving data according to one or one or more embodiments described herein, which may additionally or alternatively be used to synchronize data transmissions. Instead of extending the preamble (e.g., as illustrated in the examples illustrated in FIGS. 7 and 8), a second priority STA (e.g., STA B2) may begin sending its preamble 921B when preambles on other subchannels (e.g., preambles 921A, 921C, or 921D) end and/or when data transmissions (e.g., data transmissions 924A, 924C, or 924D) start on other subchannels. Synchronization may be obtained, for example, if the preamble of STA B2 is set to the same length as an integer number of data symbols on the subchannels. In other words, the lower priority preamble may start from the first data symbol, and it may be left open whether it's the same length, shorter, or longer in order to get the preamble length equal to the length of an integer number of data symbols. After the STA B2 sends its preamble 921B, it may send its UL payload data 924B.

Returning to FIG. 4A, the access point may send in a downlink (DL) transmission to one or more stations information indicative of the various parameters for uplink transmission determined by the access point, such as information indicating the uplink transmission opportunity (e.g., step 416), information indicating channel or subchannel assignments (e.g., step 412), information indicating UL transmission priorities for each channel or subchannel (e.g., step 414), and/or information indicating the listening period (e.g., step 418), including the start time, end time, and/or duration of the listening period. The access point may transmit the information together in a trigger frame or may transmit one or more pieces of information separately from one or more other pieces of information.

In some aspects, the access point may perform various functions or tests (not illustrated in FIG. 4A) prior to sending the parameters for uplink transmission to one or more stations (e.g., steps 412, 414, 416, and 418). For example, the access point may perform channel contention by carrying out clear channel assessment (e.g., energy detection), such as via a carrier sense multiple access with collision avoidance (CSMA/CA protocol). If the channel is free, the access point may determine to transmit to the stations.

In step 412, the access point may transmit information indicative of channel assignments of one or more stations. This information may include association IDs (AIDs) for different stations and the allocation of the channel or subchannel to each station. The allocation may be represented by a channel or subchannel index. For example, the information sent by the access point may indicate that station A is assigned to subchannel 1 (e.g., represented by subchannel index 1), station B is assigned to subchannel 2 (e.g., represented by subchannel index 2), station C is assigned to subchannel 3 (e.g., represented by subchannel index 3), station D is assigned to subchannel 4 (e.g., represented by subchannel index 4), etc. The information indicative of channel or subchannel assignments may also indicate that a plurality of stations (e.g., 2 stations, 3 stations, 4 stations, etc.) are assigned to the same channel or subchannel. In the example above, the information sent by the access point may indicate that station B1 is assigned to subchannel 2 and station B2 is also assigned to subchannel 2.

In step 414, the access point may transmit information indicative of priorities of stations within each channel or subchannel. In the example above, the information may indicate that station B1 is assigned a first (or high) priority and that station B2 is assigned a second (or low) priority. The method of determining priority was previously described in the examples above (e.g., based on access category and/or channel usage). If the information indicative of the priorities is sent in the trigger frame (TF), the access point may dedicate, for example, two bits in the TF, to carrying this priority information. Two bits may be sufficient if the number of assigned stations per subchannel is small (e.g., four or less). However, the access point may use a greater number of bits in the TF if needed to carry the priority information.

In step 416, the access point may transmit information indicative of the uplink transmission opportunity (TXOP). For example, the access point may transmit information indicative of a start time of the TXOP, the end time of the TXOP, the frequency band for the TXOP, the time duration of the TXOP, and the like.

In step 418, the access point may transmit information indicative of the listening period for each of the stations. This information may include the start time of the listening period, an end time of the listening period, and/or the duration of the listening period. As previously explained, the listening period may be different for stations having different priorities. For example, a station having the highest priority on a channel might not have a listening period and instead may transmit data (e.g., immediately) in response to receiving a trigger frame from the access point. A station having the second highest priority on the channel may have a listening period of, for example, T. A station having the third priority on the channel may have a listening period of, for example, 2T, and so forth. In some aspects, if the AP specifies the listening period for each station, the AP might not send separate information indicative of the stations' priority because each station may be able to determine its priority based on the specified listening period. For example, a station having a listening duration of T may determine that it has a second priority. A station having a listening duration of 2T may determine that it has a third priority, and so forth.

The listening period may also differ based on the type of UL transmission synchronization technique used. Examples of synchronization were previously explained and may include, for example, adjusting the duration of an STF in a preamble (e.g., as described with reference to FIG. 7 and FIG. 8) and/or timing the preamble such that its transmission by a lower priority station starts at the beginning of payload transmission on other channels or subchannels (e.g., as described with reference to FIG. 9).

The information transmitted in steps 412, 414, 416, and/or 418 may be transmitted by the access point as part of the trigger frame or as separate transmissions. After the access point transmits the information, it may wait to receive uplink data from one or more of the stations (e.g., in step 420).

Figure 5A:
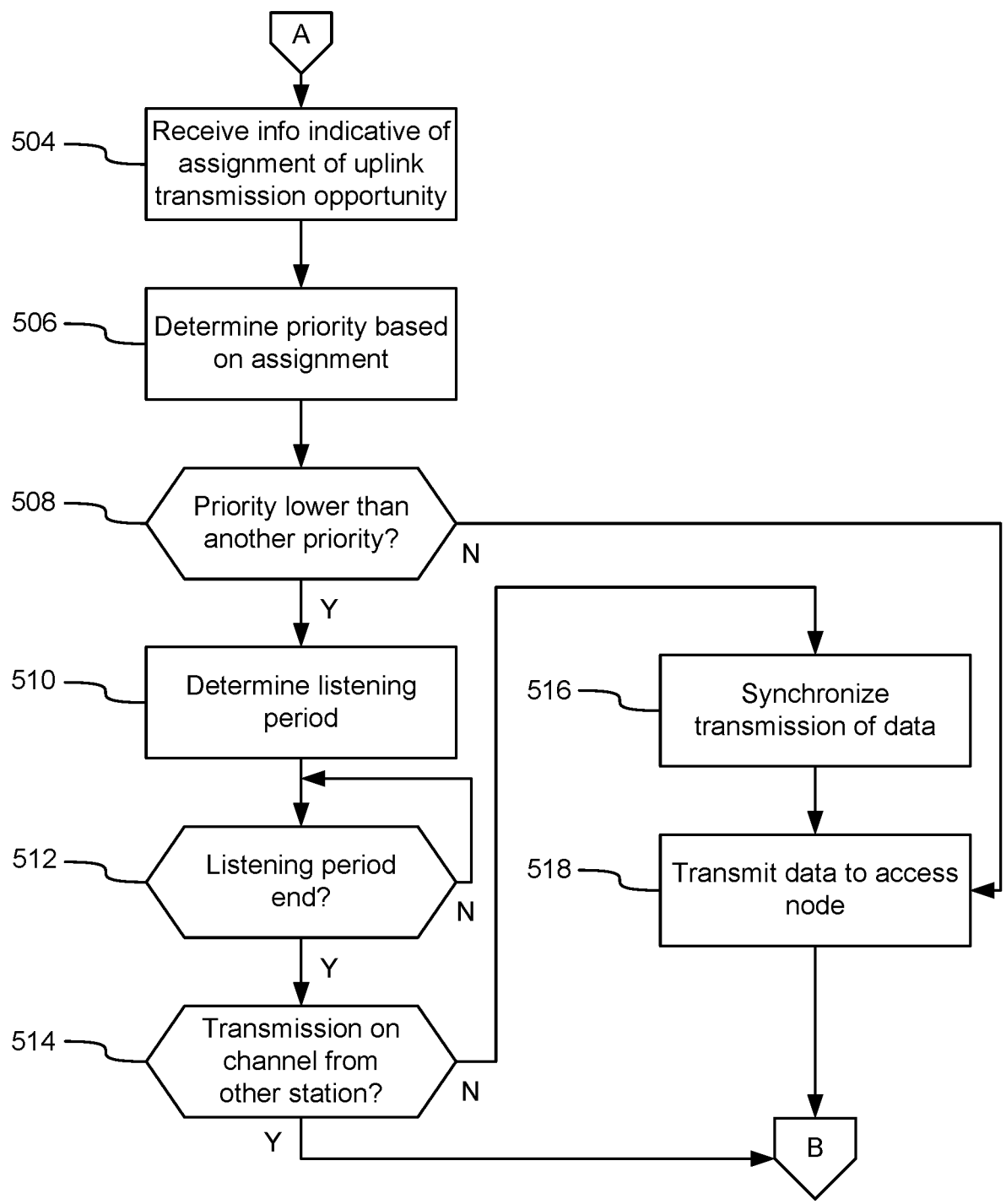
FIG. 5A illustrates an example method for improving spectrum efficiency for wireless communications according to one or more embodiments described herein.

FIG. 5A illustrates an example method for improving spectrum efficiency for wireless communications according to one or more embodiments described herein. One or more steps illustrated in FIG. 5A may be performed by one or more computing device, such as a station (e.g., stations 105, 110, 115, or 120 illustrated in FIG. 1, stations A, B, C, D, or E illustrated in FIG. 2, or stations A1, A2, B1, B2, C1, C2, D1, or D2 illustrated in FIG. 10). Some of the steps illustrated in FIG. 5A may be optional.

In step 504, the station may receive information sent by an access point, and the information may be indicative of an assignment of an uplink transmission opportunity. In some aspects, the information may indicate parameters for uplink transmissions by the station to the access point, such as information indicating the uplink transmission opportunity, information indicating channel or subchannel assignments for the station, information indicating UL transmission priorities for the stations assigned the channel or subchannel, and/or information indicating the listening period for the station, including the start time, end time, and/or duration of the listening period. The information may be received in a trigger frame (or as separate transmissions).

In step 506, the station may determine its priority based on the assignment information from the access point. The station may determine whether it is the highest priority station for a channel or subchannel, whether it is the second highest priority station for the channel or subchannel, whether it is the lowest priority station for the channel or subchannel, etc. For example, a station B2 may determine that it is the second highest priority station for a channel or subchannel among a group of stations.

In step 508, the station may determine whether its priority is lower than the priority of another station assigned to the same channel or subchannel. For example, a station B2 may determine that it has a lower priority than a station B1 assigned to the same channel or subchannel. The station B2 may also determine that it has a higher priority than a station B3 also assigned to the same channel or subchannel. If the station determines that its priority is not lower than any other priorities (e.g., that it has the highest priority) (step 508: N), the station may proceed to step 518 to begin UL data transmission, as will be described in further detail below. On the other hand, if the station determines that its priority is lower than another station's priority (step 508: Y), the station may proceed to step 510.

In step 510, the station may determine its listening period, such as the start time, end time, and/or duration of its listening period. The listening period may be indicated in the trigger frame received from the access point. For example, if the station is a second priority station (e.g., station B2), the listening period may comprise a duration T, as previously described with reference to, for example, FIG. 6, FIG. 7, FIG. 8, or FIG. 9. If the station is a third priority station (e.g., station B3), the listening period may comprise a duration 2T. In some aspects, instead of receiving the listening period in the trigger frame, the station may make its own calculation of the listening period based on its assigned priority. The determination may be the same as the determination described above with reference to step 410 illustrated in FIG. 4A. For example, the listening period may be a fixed duration based on the stations priority, such as 34 microseconds for station B2, 68 microseconds for station B3, etc. That is, the listening duration for the STA having priority i may be, for example, (i−1)*T (and T may be 34 microseconds).

As another example, the listening period may be determined based on a determination of the STF of the preamble, as previously described with reference to FIG. 7 and FIG. 8. In another example, step 510 may precede step 508, and the station's priority may be determined based on the previously determined listening period (e.g., 0T corresponds to 1st priority, 1T corresponds to $2^{nd}$ priority, 2T corresponds to $3^{rd}$ priority, etc.).

In step 512, the station may listen for data transmissions on the assigned channel or subchannel from higher priority stations to the access point during the listening period. For example, during its listening period, a station B2 having a second priority may listen for data transmissions from a station B1 having a first priority. A station B3 having a third priority may listen for data transmissions from both the station B2 and the station B1, during station B3's listening period. As previously explained, the listening period for station B3 may be longer than the listening period for station B2.

In step 514, the station may determine whether an uplink data transmission on the channel or subchannel from another station (e.g., higher priority station) occurred during the listening period. If so (step 514: Y), the station may determine that a UL transmission from a higher priority station occurred, and in response, the station consequently does not transmit UL data. If the station determines that an uplink transmission from a higher priority station did not occur during the listening period (step 514: N), the station may determine that it is permitted to transmit UL data to the access point on the assigned channel or subchannel because another higher priority station did not use the transmission opportunity. The station may proceed to step 516.

In step 516, if the station has uplink data to transmit, the station may synchronize its uplink data transmission with the uplink data transmission of one or more other stations, such as other stations utilizing the same transmission opportunity as the station. Data synchronization was previously described with reference to FIG. 7, FIG. 8, and FIG. 9, but will be briefly described here with reference to FIG. 5B and FIG. 5C.

Figure 5B:
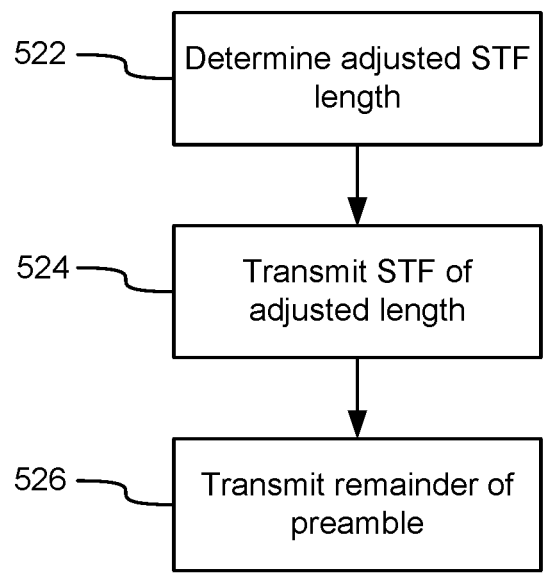
FIG. 5B illustrates an example method for transmitting a preamble according to one or more embodiments described herein.

FIG. 5B illustrates an example method for transmitting a preamble according to one or more embodiments described herein, e.g., such that the UL data transmission is synchronized. Some of the steps illustrated in FIG. 5B may be optional. As previously described with reference to FIG. 7 and FIG. 8, the STF of a preamble transmitted by the station may be adjusted based on the station's priority. In step 522, the station may determine the length of the adjusted STF based on the station's priority. The length of the STF may be indicated in the TF received from the access point, and/or the station may itself determine the length. As previously described, the STF of the first priority station may be longer than the STF of the second priority station, the STF of the second priority station may be longer than the STF of the third priority station, and so on. The STF length may be determined using an expression, such as the following:

$$STF(i)=STF+(N-i)*T$$

The station may adjust the length and/or start time of the STF so that the LTF (and/or SIG) transmitted by the station aligns with the LTF (and/or SIG) transmitted by other stations in the same transmission opportunity, as illustrated in FIG. 8.

In step 524, the station may begin transmission of the adjusted length STF at the time determined in step 522 (and for a corresponding duration). In step 526, the station may transmit, after transmitting the STF, the remainder of the preamble, such as the LTF and/or SIG fields.

Figure 5C:
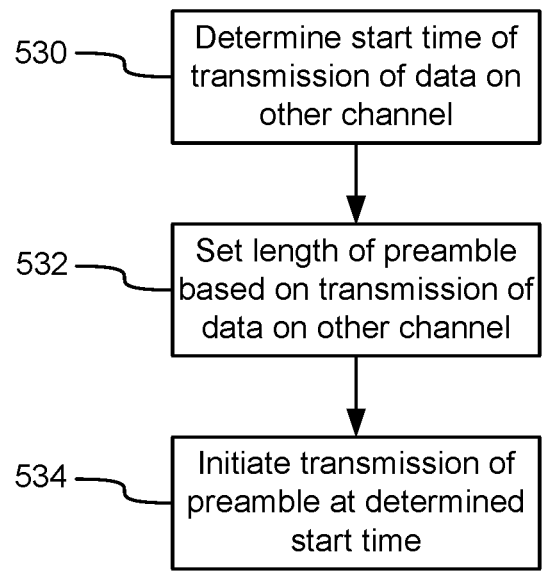
FIG. 5C illustrates another example method for transmitting a preamble according to one or more embodiments described herein.

FIG. 5C illustrates another example method for transmitting a preamble according to one or more embodiments described herein e.g., such that the UL data transmission is synchronized. Some of the steps illustrated in FIG. 5C may be optional. As previously described with reference to FIG. 9, the station may begin UL transmission of a preamble at a time that a first data symbol is transmitted by another station during the transmission opportunity. In step 530, the station may determine the start time of data (e.g., payload data) transmissions on another channel or subchannel during the transmission opportunity. In step 532, the station may set the length of its preamble based on the transmission of data on the other channel or subchannel. For example, the preamble may be set to the same length as an integer number of the data symbol or data symbols of the transmission on the other channel or subchannel. In step 534, the station may initiate transmission of the preamble at the determined start time and/or transmit the preamble for the determined length.

Returning to FIG. 5A, the station, in step 518, may transmit UL data (e.g., synchronized UL data) to the access point on the channel or subchannel assigned to the station, during the transmission opportunity. The data may comprise a preamble and payload data. With brief reference to FIG. 4A, the access point, in step 420, may receive the uplink data from one or more stations during the transmission opportunity.

Figure 11:
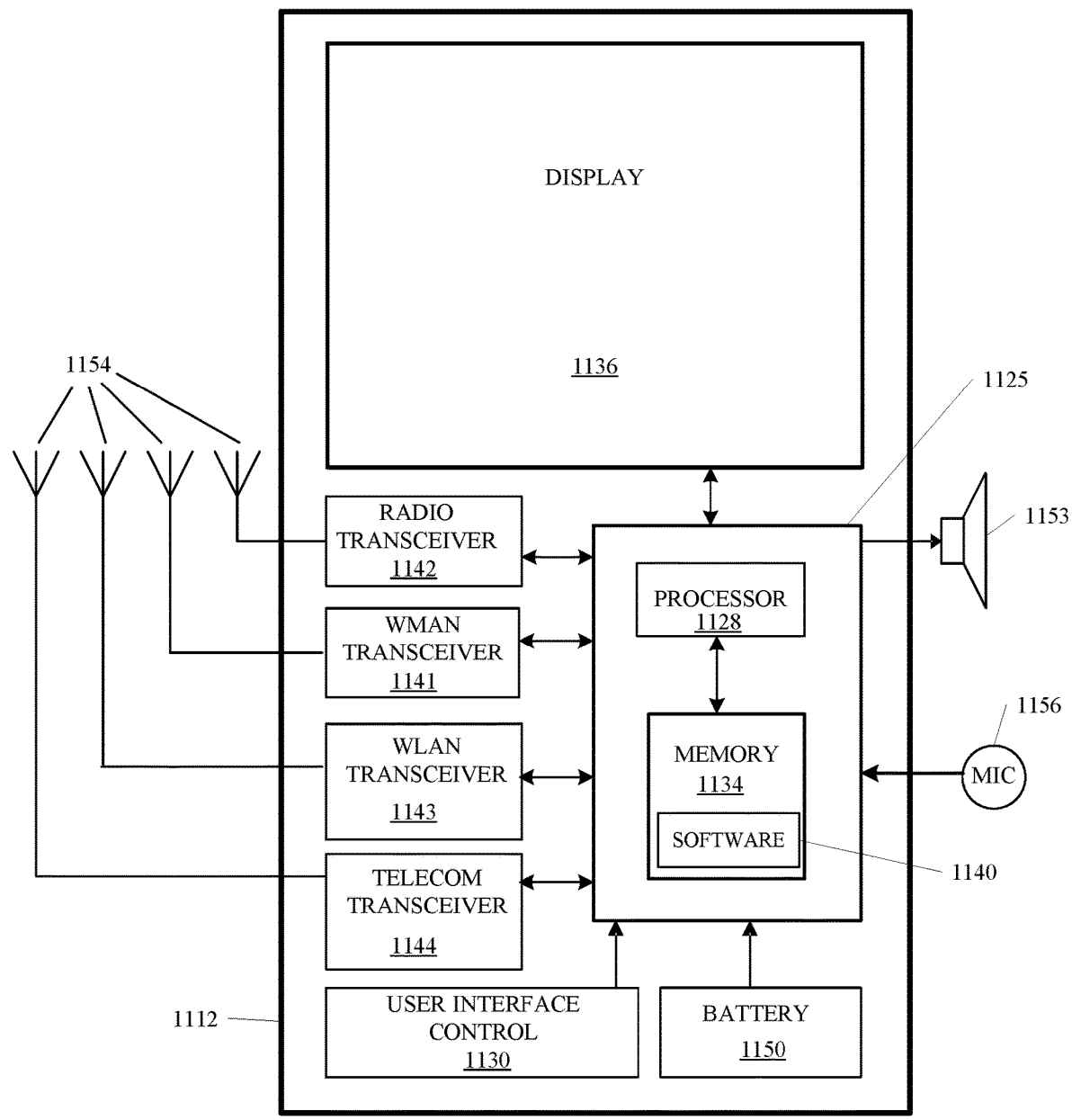
FIG. 11 is a block diagram of an example communication device according to one or more embodiments described herein.

FIG. 11 illustrates an example apparatus, in particular a computing device 1112, that may be used in a communication network such as the one illustrated in FIG. 1, FIG. 2, or FIG. 10, to implement any or all of stations 105, 110, 115, 120, and/or AP 130, to perform the steps, data transmissions, and data receptions illustrated in FIGS. 3-9. Computing device 1112 may include a controller 1125. The controller 1125 may be connected to a user interface control 1130, display 1136 and/or other elements as illustrated. Controller 1125 may include circuitry, such as for example one or more processors 1128 and one or more memory 1134 storing software 1140. The software 1140 may comprise, for example, one or more of the following software options: client software 165, user interface software, server software, etc.

Device 1112 may also include a battery 1150 or other power supply device, speaker 1153, and one or more antennae 1154. Device 1112 may include user interface circuitry, such as user interface control 1130. User interface control 1130 may include controllers or adapters, and other circuitry, configured to receive input from or provide output to a keypad, touch screen, voice interface—for example via microphone 1156, function keys, joystick, data glove, mouse and the like. The user interface circuitry and user interface software may be configured to facilitate user control of at least some functions of device 1112 though use of a display 1136. Display 1136 may be configured to display at least a portion of a user interface of device 1112. Additionally, the display may be configured to facilitate user control of at least some functions of the device (for example, display 1136 could be a touch screen).

Software 1140 may be stored within memory 1134 to provide instructions to processor 1128 such that when the instructions are executed, processor 1128, device 1112 and/or other components of device 1112 are caused to perform various functions or methods such as those described herein. The software may comprise machine executable instructions and data used by processor 1128 and other components of computing device 1112 may be stored in a storage facility such as memory 1134 and/or in hardware logic in an integrated circuit, ASIC, etc. Software may include both applications and operating system software, and may include code segments, instructions, applets, pre-compiled code, compiled code, computer programs, program modules, engines, program logic, and combinations thereof.

Memory 1134 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 1128 (and any other processor or computer described herein) may include any of various types whether used alone or in combination with executable instructions stored in a memory or other computer-readable storage medium should be understood to encompass any of various types of well-known computing structures including but not limited to one or more microprocessors, special-purpose computer chips, field-programmable gate arrays (FPGAs), controllers, application-specific integrated circuits (ASICs), combinations of hardware/firmware/software, or other special or general-purpose processing circuitry.

As used in this application, the term 'circuitry' may refer to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

These examples of 'circuitry' apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a baseband integrated circuit or applications processor integrated circuit for a mobile phone or a similar integrated circuit in a server, a cellular network device, or other network device Device 1112 or its various components may be mobile and be configured to receive, decode and process various types of transmissions including transmissions in Wi-Fi networks according to a wireless local area network (e.g., the IEEE 802.11 WLAN standards 802.11n, 802.11ac, etc.) and/or wireless metro area network (WMAN) standards (e.g., 802.16), through a specific one or more WLAN transceivers 1143, one or more WMAN transceivers 1141. There exists an 802.11ax task group the purpose of which is to improve spectrum efficiency. One or more embodiments described herein may be applicable to a wireless local area network with improved spectrum efficiency. Additionally or alternatively, device 1112 may be configured to receive, decode and process transmissions through various other transceivers, such as FM/AM Radio transceiver 1142, and telecommunications transceiver 1144 (e.g., cellular network receiver such as CDMA, GSM, etc.).

Although the above description of FIG. 11 generally relates to a mobile device, other devices or systems may include the same or similar components and perform the same or similar functions and methods. For example, a computer communicating over a wired network connection (for example, PC 115 of FIG. 1) may include the components or a subset of the components described above, and may be configured to perform the same or similar functions as device 1112 and its components. Further access points as described herein may include the components, a subset of the components, or a multiple of the components (e.g., integrated in one or more servers) configured to perform the steps, described herein.

Numerous other embodiments, modifications, and variations within the scope and spirit of the appended claims will occur to persons of ordinary skill in the art from a review of this disclosure and be recognized as being within the scope of the invention.

Although specific examples of carrying out the invention have been described, those skilled in the art will appreciate that there are numerous variations and permutations of the above-described systems and methods that are contained within the spirit and scope of the invention as set forth in the appended claims. For example, carrying out the invention in some embodiments has been described in view of wireless local area networks, embodiments of the invention may be applied to various other wireless access systems. The various other wireless access systems may, for example, apply OFDMA.

We claim:

1. A method comprising:
   receiving, by a first station from an access node, information indicative of an uplink transmission opportunity in a wireless local area network, shared by the first station and a second station, on a frequency channel, the information indicating a first priority for the first station and a second priority for the second station, the first priority being different from the second priority, the information further specifying a listening period within the uplink transmission opportunity;
   when the first priority is lower than the second priority, listening, by the first station, for a transmission on the frequency channel from the second station to the access node during the listening period; and, in case the transmission on the frequency channel from the second station did not occur during the listening period, transmitting, by the first station, data to the access node on the frequency channel during the uplink transmission opportunity after the listening period has ended; and
   when the first priority is higher than the second priority, transmitting, by the first station to the access node, data to the access node on the frequency channel during the uplink transmission opportunity without listening during the listening period.

2. The method of claim 1, wherein the information indicates that the first priority is lower than the second priority.

3. The method of claim 1, wherein the listening is performed in response to the first station receiving a trigger frame from the access node.

4. The method of claim 1, wherein the information indicative of an uplink transmission opportunity is received in a trigger frame from the access node.

5. The method of claim 1, wherein the frequency channel comprises a subchannel of a Wi-Fi channel, the method further comprising:
   determining a start time of a transmission of payload data on at least one other subchannel of the Wi-Fi channel, wherein the transmitting the data to the access node comprises initiating transmission of a preamble at the start time of the transmission of the payload data on the at least one other subchannel.

6. The method of claim 5, further comprising:
   setting a length of the preamble to a length of an integer number of data symbols of the payload data transmitted on the at least one other subchannel.

7. The method of claim 1, wherein the frequency channel comprises a subchannel of a Wi-Fi channel, and wherein the data comprises a preamble and payload data, and wherein the transmitting the data to the access node comprises:
   transmitting, by the first station, the preamble, wherein the preamble is shorter than a preamble transmitted on at least one other subchannel of the Wi-Fi channel; and
   after transmitting the preamble, initiating transmission, by the first station, of the payload data at a same time as transmission of payload data on the at least one other subchannel is initiated.

8. The method of claim 1, wherein receiving the indication of the listening period comprises receiving the indication of the listening period within a trigger frame received from the access node.

9. The method of claim 1, wherein the frequency channel is a subchannel of a Wi-Fi channel.

10. An apparatus comprising:
    at least one processor; and
    at least one memory including computer program code, wherein the at least one memory and the computer program code are configured, with the at least one processor, to cause the apparatus at least to perform:
    receiving, by the apparatus from an access node, information indicative of an uplink transmission opportunity in a wireless local area network, shared by the apparatus and a second station, on a frequency channel, the information indicating a first priority for the apparatus and a second priority for the second station, the first priority being different from the second priority, the information further specifying a listening period within the uplink transmission opportunity;
    when the first priority is lower than the second priority, listening, by the apparatus, for a transmission on the frequency channel from the second station to the access node during the listening period; and, in case the transmission on the frequency channel from the second station did not occur during the listening period, transmitting, by the apparatus, data to the access node on the frequency channel during the uplink transmission opportunity after the listening period has ended; and
    when the first priority is higher than the second priority, transmitting, by the apparatus to the access node, data to the access node on the frequency channel during the uplink transmission opportunity without listening during the listening period.

11. The apparatus of claim 10, wherein the listening is performed in response to the apparatus receiving a trigger frame from the access node.

12. The apparatus of claim 10, wherein the frequency channel comprises a subchannel of a Wi-Fi channel, and wherein the at least one memory and the computer program code are configured to, with the at least one processor, cause the apparatus at least to perform:
    determining a start time of a transmission of payload data on at least one other subchannel of the Wi-Fi channel, wherein the transmitting the data to the access node comprises initiating transmission of a preamble at the start time of the transmission of the payload data on the at least one other subchannel.

13. The apparatus of claim 10, wherein the frequency channel is a subchannel of a Wi-Fi channel.

14. A non-transitory computer-readable storage medium encoded with instructions that, when executed by at least one processor of a first station, causes the first station at least to perform:
    receiving, by a first station from an access node, information indicative of an uplink transmission opportunity in a wireless local area network, shared by the first station and a second station, on a frequency channel, the information indicating a first priority for the first station and a second priority for the second station, the first priority being different from the second priority, the information further specifying a listening period within the uplink transmission opportunity;

when the first priority is lower than the second priority, listening, by the first station, for a transmission on the frequency channel from the second station to the access node during the listening period; and, in case the transmission on the frequency channel from the second station did not occur during the listening period, transmitting, by the first station, data to the access node on the frequency channel during the uplink transmission opportunity after the listening period has ended; and when the first priority is higher than the second priority, transmitting, by the first station to the access node, data to the access node on the frequency channel during the uplink transmission opportunity without listening during the listening period.

15. The non-transitory computer-readable storage medium of claim 14, wherein the information indicates that the first priority is lower than the second priority.

16. The non-transitory computer-readable storage medium of claim 14, wherein the frequency channel is a subchannel of a Wi-Fi channel.

* * * * *